United States Patent
Imai et al.

(10) Patent No.: US 10,864,748 B2
(45) Date of Patent: Dec. 15, 2020

(54) IMAGE RECORDING METHOD, INK, AND LIQUID COMPOSITION

(71) Applicant: CANON KABUSHIKI KAISHA, Tokyo (JP)

(72) Inventors: Takashi Imai, Kawasaki (JP); Mamiko Kaji, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/964,304

(22) Filed: Apr. 27, 2018

(65) Prior Publication Data

US 2019/0126633 A1    May 2, 2019

Related U.S. Application Data

(62) Division of application No. 14/983,909, filed on Dec. 30, 2015, now Pat. No. 9,981,480.

(30) Foreign Application Priority Data

Jan. 8, 2015 (JP) .................... 2015-002611

(51) Int. Cl.
*B41J 2/21* (2006.01)
*C08K 5/053* (2006.01)
(Continued)

(52) U.S. Cl.
CPC .......... *B41J 2/2114* (2013.01); *B41J 2/2107* (2013.01); *B41J 2/2117* (2013.01); *C08K 5/053* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| 5,382,283 A | 1/1995 | Yui et al. |
| 6,935,732 B2 | 8/2005 | Takada et al. |

(Continued)

FOREIGN PATENT DOCUMENTS

| CN | 102822288 A | 12/2012 |
| EP | 1 010 802 A2 | 6/2000 |

(Continued)

OTHER PUBLICATIONS

Jul. 2, 2018 extended European Search Report in European Patent Appln. No. 18169860.6.

(Continued)

*Primary Examiner* — Manish S Shah
(74) *Attorney, Agent, or Firm* — Venable LLP

(57) ABSTRACT

An image recording method including the steps of applying an ink containing a coloring material and anionic resin particles to a recording medium, and applying a liquid composition to the recording medium so as to at least partly overlap with an area where the ink is applied, the liquid composition destabilizing a dispersion state of the coloring material or of the anionic resin particles in the ink. The ink contains a trihydric or higher polyhydric alcohol compound having a group formed by substituting a hydrogen atom of a hydroxyl group by a structure represented by $-R_n-H$, where R is an alkyleneoxy group including an ethyleneoxy group, and the number of Rs per molecule is 40 or more and 120 or less when the polyhydric alcohol is a trihydric alcohol and is 12 or more and 400 or less when the polyhydric alcohol is a tetrahydric or higher polyhydric alcohol.

12 Claims, 1 Drawing Sheet

(51) Int. Cl.
    *C09D 133/08*     (2006.01)
    *C09D 11/38*     (2014.01)
    *C09D 11/40*     (2014.01)
    *C09D 11/54*     (2014.01)

(52) U.S. Cl.
    CPC .............. *C09D 11/38* (2013.01); *C09D 11/40* (2013.01); *C09D 11/54* (2013.01); *C09D 133/08* (2013.01)

(58) Field of Classification Search
    CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; B41M 5/0011; B41M 5/0017; B41M 5/0047; B41M 7/00; B41M 7/0072; B41M 5/52; B41M 5/5218; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52

See application file for complete search history.

(56) References Cited

U.S. PATENT DOCUMENTS

| | | | |
|---|---|---|---|
| 7,276,112 | B2 | 10/2007 | Tokuda et al. |
| 7,377,631 | B2 | 5/2008 | Takada et al. |
| 7,402,200 | B2 | 7/2008 | Imai et al. |
| 7,635,182 | B2 | 12/2009 | Hakamada et al. |
| 7,883,199 | B2 | 2/2011 | Hakamada et al. |
| 7,909,448 | B2 | 3/2011 | Iwata et al. |
| 7,947,762 | B2 | 5/2011 | Udagawa et al. |
| 8,016,406 | B2 | 9/2011 | Hakamada et al. |
| 8,217,097 | B2 | 7/2012 | Udagawa et al. |
| 8,324,293 | B2 | 12/2012 | Imai et al. |
| 8,362,108 | B2 | 1/2013 | Imai |
| 8,367,750 | B2 | 2/2013 | Moribe et al. |
| 8,664,296 | B2 | 3/2014 | Yanagi et al. |
| 8,741,984 | B2 | 6/2014 | Moribe et al. |
| 8,807,699 | B2 | 8/2014 | Ooishi et al. |
| 8,870,339 | B2 | 10/2014 | Tojo et al. |
| 9,624,395 | B2 | 4/2017 | Kaji et al. |
| 9,783,694 | B2 | 10/2017 | Tominaga et al. |
| 2004/0233262 | A1 | 11/2004 | Randler et al. |
| 2006/0100311 | A1* | 5/2006 | Tokuda .............. C09D 11/326 523/160 |
| 2006/0160924 | A1 | 7/2006 | Kakuchi et al. |
| 2007/0097156 | A1 | 5/2007 | Udagawa et al. |
| 2010/0003408 | A1 | 1/2010 | Yanagi et al. |
| 2010/0203247 | A1 | 8/2010 | Kariya et al. |
| 2011/0037805 | A1 | 2/2011 | Arai et al. |
| 2011/0069111 | A1 | 3/2011 | Matsumoto et al. |
| 2012/0026237 | A1* | 2/2012 | Hakiri .............. C09D 11/324 347/20 |
| 2012/0229559 | A1 | 9/2012 | Matsushita |
| 2012/0236068 | A1 | 9/2012 | Matsushita |
| 2013/0085206 | A1* | 4/2013 | Zimmer .............. C09D 11/322 523/122 |
| 2014/0192121 | A1 | 7/2014 | Bannai et al. |
| 2014/0307023 | A1 | 10/2014 | Moribe et al. |
| 2016/0075898 | A1 | 3/2016 | Imai et al. |
| 2016/0075899 | A1 | 3/2016 | Imai et al. |
| 2016/0200925 | A1 | 7/2016 | Kaji et al. |

FOREIGN PATENT DOCUMENTS

| | | |
|---|---|---|
| EP | 2 230 281 A1 | 9/2010 |
| JP | S62-15269 A | 1/1987 |
| JP | H07-144485 A | 6/1995 |
| JP | H10-158562 A | 6/1998 |
| JP | 2002-167533 A | 6/2002 |
| JP | 2006-199823 A | 8/2006 |
| JP | 2010-006857 A | 1/2010 |
| JP | 2010-031267 A | 2/2010 |
| JP | 2010-162726 A | 7/2010 |
| JP | 2011-173330 A | 9/2011 |
| JP | 2012-187868 A | 10/2012 |
| JP | 2012-193268 A | 10/2012 |
| WO | 2012/132305 A1 | 10/2012 |

OTHER PUBLICATIONS

May 21, 2018 Korean Official Action in Korean Patent Appln. No. 10-2016-0001915.
Jun. 8, 2016 European Search Report in European Patent Appln. No. 15003692.9.
Feb. 2, 2018 Chinese Official Action in Chinese Patent Appln. No. 201610009669.6.
Japanese Office Action dated Sep. 24, 2019, in Japanese Patent Appln. No. 2016-002755.
Japanese Office Action dated Feb. 25, 2020, in Japanese Patent Appln. No. 2016-002755.
Korean Office Action dated Sep. 25, 2019, in Korean Patent Appln. No. 10-2019-0092293.
Korean Office Action dated Apr. 27, 2020, in Korean Patent Appln. No. 10-2019-0092293.

* cited by examiner

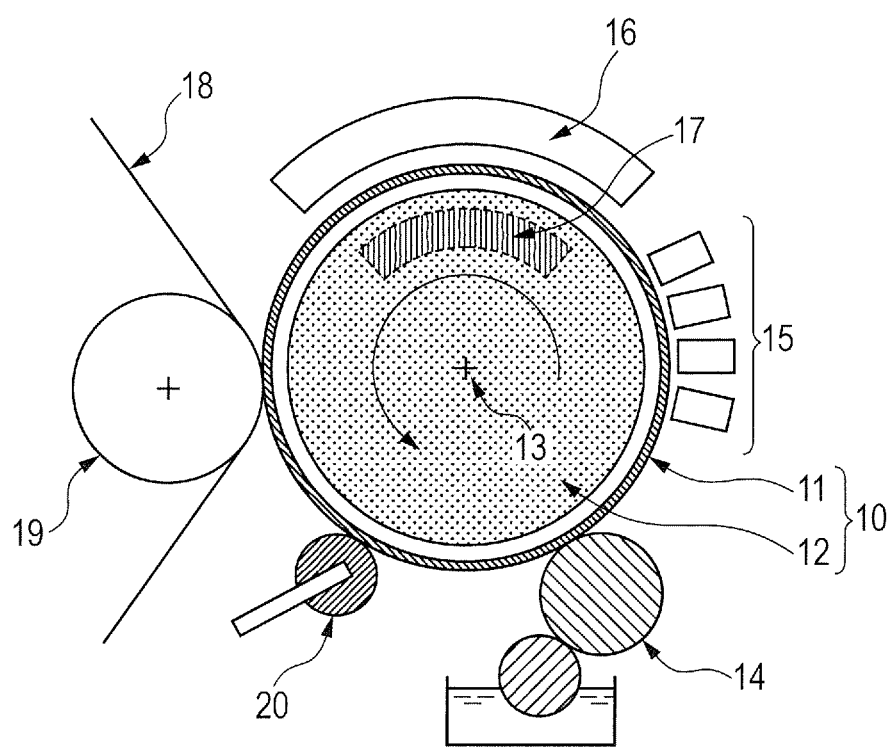

IMAGE RECORDING METHOD, INK, AND LIQUID COMPOSITION

BACKGROUND OF THE INVENTION

Field of the Invention

The present invention relates to an image recording method and to an ink and a liquid composition used for the image recording method.

Description of the Related Art

In conventional image recording methods, a two-liquid reaction type image recording method (two-liquid reaction system) using an ink containing a pigment (pigment ink) and a liquid composition that destabilizes the dispersion state of the pigment in the ink has been studied.

Japanese Patent Application Laid-Open No. 2010-31267 discloses an image recording method using an ink containing a pigment and resin particles having a structure derived from a methacrylic acid derivative and a liquid composition containing an organic acid, and describes the suppression of the image shift phenomenon mentioned later.

SUMMARY OF THE INVENTION

The above object is achieved by the following present invention.

An image recording method of the present invention includes the steps of applying an ink containing a coloring material and anionic resin particles to a recording medium and applying a liquid composition to the recording medium so as to at least partly overlap with an area where the ink is applied, the liquid composition destabilizing a dispersion state of the coloring material or of the anionic resin particles in the ink. In the image recording method, the ink contains a trihydric or higher polyhydric alcohol compound having a group formed by substituting a hydrogen atom of a hydroxyl group by a structure represented by —$R_n$—H (where R is an alkyleneoxy group including an ethyleneoxy group; and the number of Rs per molecule is 40 or more and 120 or less when the polyhydric alcohol is a trihydric alcohol and is 12 or more and 400 or less when the polyhydric alcohol is a tetrahydric or higher polyhydric alcohol) (hereinafter referred to as the first invention).

Another image recording method of the present invention includes the steps of applying an ink containing a coloring material and anionic resin particles to a recording medium and applying a liquid composition to the recording medium so as to at least partly overlap with an area where the ink is applied, the liquid composition destabilizing a dispersion state of the coloring material or of the anionic resin particles in the ink. In the image recording method, the liquid composition contains a trihydric or higher polyhydric alcohol compound having a group formed by substituting a hydrogen atom of a hydroxyl group by a structure represented by —$R_n$—H (where R is an alkyleneoxy group including an ethyleneoxy group; and the number of Rs per molecule is 40 or more and 120 or less when the polyhydric alcohol is a trihydric alcohol and is 12 or more and 400 or less when the polyhydric alcohol is a tetrahydric or higher polyhydric alcohol) (hereinafter referred to as the second invention).

Still another image recording method of the present invention includes the steps of applying a clear ink containing anionic resin particles to a recording medium and applying a liquid composition to the recording medium to at least partly overlap with an area where the clear ink is applied, the liquid composition destabilizing a dispersion state of the anionic resin particles in the clear ink. In the image recording method, the clear ink contains a trihydric or higher polyhydric alcohol compound having a group formed by substituting a hydrogen atom of a hydroxyl group by a structure represented by —$R_n$—H (where R is an alkyleneoxy group including an ethyleneoxy group; and the number of Rs per molecule is 40 or more and 120 or less when the polyhydric alcohol is a trihydric alcohol and is 12 or more and 400 or less when the polyhydric alcohol is a tetrahydric or higher polyhydric alcohol) (hereinafter referred to as the third invention).

According to the present invention, an image recording method capable of giving images with high image quality can be provided.

Further features of the present invention will become apparent from the following description of exemplary embodiments with reference to the attached drawing.

BRIEF DESCRIPTION OF THE DRAWINGS

FIGURE is a schematic view illustrating an example structure of a recording apparatus used in the present invention.

DESCRIPTION OF THE EMBODIMENTS

The inventors of the present invention have examined the image recording method according to Japanese Patent Application Laid-Open No. 2010-31267 and have failed to obtain any image with high-level image quality when high speed recording, which has been recently demanded, is carried out.

An object of the present invention is thus to provide an image recording method capable of giving images with high image quality when high speed recording is carried out.

The present invention will now be described in detail with reference to preferred embodiments.

The inventors of the present invention have first studied the reason why the image recording method using the conventional two-liquid reaction system cannot give an image with high-level image quality when high speed recording is carried out. The results will be described below.

The image recording method using the conventional two-liquid reaction system is designed so that the reactivity between an ink (including a clear ink) and a liquid composition becomes high in order to effectively suppress blurring or bleeding. Specifically, the ink containing a coloring material and anionic resin particles (clear ink containing anionic resin particles) and the liquid composition are formulated so that the coloring material or the anionic resin particles immediately aggregate on a recording medium when the ink (clear ink) comes in contact with the liquid composition. When high speed recording is carried out, the application timing of the ink (clear ink) is quite close to the application timing of the liquid composition, and thus the ink in a liquid state is mixed with the liquid composition in a liquid state in some cases. At this time, when the reactivity between the ink (clear ink) and the liquid composition is excessively high, volumetric shrinkage is caused during aggregation of the coloring material or the resin particles. The shrunk aggregate of the coloring material or the resin particles shifts in an area where the ink (clear ink) and the liquid composition have been applied. This unfortunately causes the phenomenon in which the coloring material is fixed to an area shifted from an intended area on a recording medium (image shift phenomenon).

The inventors of the present invention have studied the method for suppressing the image shift phenomenon and have arrived at the configuration of the present invention. Specifically, an ink containing a coloring material and anionic resin particles (first invention), a clear ink containing anionic resin particles (third invention), or a liquid composition used in combination with the ink (clear ink) (second invention) contains a polyhydric alcohol compound in which the hydrogen atom of a hydroxyl group is substituted by the structure represented by —$R_n$—H (where R is an alkyleneoxy group including an ethyleneoxy group; the number of Rs per molecule is 40 or more and 120 or less when the polyhydric alcohol is a trihydric alcohol and is 12 or more and 400 or less when the polyhydric alcohol is a tetrahydric or higher polyhydric alcohol). Mechanisms of producing the advantageous effect of the present invention with this configuration will be described below.

In the polyhydric alcohol compound, the structure represented by —$R_n$—H (polyalkyleneoxy group) substituted for the hydrogen atom contains a polyethyleneoxy structure [—$(CH_2CH_2O)_X$—]. In addition, the polyhydric alcohol compound has an oxygen atom derived from a hydroxyl group, and thus can form a hydrogen bond with a coloring material or anionic resin particles in the ink. Hence, when the ink is mixed with the liquid composition, the coloring material or the anionic resin particles undergo aggregation reaction while adsorbing the polyhydric alcohol compound. At this time, the aggregation reaction itself proceeds immediately, but the resulting aggregate is present among the coloring material or the resin particles with the polyhydric alcohol compound incorporated therein, and thus the volumetric shrinkage is unlikely to be caused by the aggregation reaction. In this manner, the image shift phenomenon is supposed to be suppressed while the high-speed aggregating properties are improved.

In such a manner of the above mechanism, the respective components synergistically affect each other, and consequently the advantageous effect of the present invention can be achieved.

<Polyhydric alcohol compound having a group formed by substituting the hydrogen atom of a hydroxyl group by the structure represented by —$R_n$—H (where R is an alkyleneoxy group including an ethyleneoxy group; the number of Rs per molecule is 40 or more and 120 or less when the polyhydric alcohol is a trihydric alcohol and is 12 or more and 400 or less when the polyhydric alcohol is a tetrahydric or higher polyhydric alcohol)>

In the present invention, the polyhydric alcohol compound is a compound having three or more carbon atoms and having three or more hydroxyl groups (that is, a trihydric or higher polyhydric alcohol compound). In the present invention, examples of the polyhydric alcohol include sorbitol, maltitol, xylitol, erythritol, lactitol, mannitol, glycerol, diglycerol, polyglycerol, oligo-sugar alcohols, palatinit, threitol, arabinitol, ribitol, iditol, volemitol, perseitol, octitol, galactitol, trimethylolpropane, trimethylolethane, dimethylolheptane, glucose, glucosides, and condensates thereof. Examples of the condensate of the polyhydric alcohol include dipentaerythritol. Specifically, the polyhydric alcohol is preferably sorbitol, xylitol, erythritol, dipentaerythritol, mannitol, glycerol, diglycerol, polyglycerol, or trimethylolethane.

The structure represented by —$R_n$—H (where R is an alkyleneoxy group including an ethyleneoxy group) is a polyalkyleneoxy group including a polyethyleneoxy structure [—$(CH_2CH_2O)_X$—]. R (alkyleneoxy group) is preferably a methyleneoxy group or a propyleneoxy group in addition to the ethyleneoxy group. R may be a combination of a plurality of alkyleneoxy groups. For example, the structure includes the case in which both an ethyleneoxy group and a propyleneoxy group are contained and the sum of the respective repetition numbers is n. In the present invention, the structure represented by —$R_n$—H may be a random copolymer or block copolymer composed of the ethyleneoxy group and other alkyleneoxy groups. In such a case, the proportion of the ethyleneoxy group is preferably 5% by mass or more of the total amount from the viewpoint of water-solubility. In the present invention, the structure is preferably a block copolymer of an ethyleneoxy group and a propyleneoxy group. For example, the structure is preferably [—$(CH_2CH_2O)_X$—$(CHCH_3CH_2O)_Y$—H] or [—$(CHCH_3CH_2O)_Y$—$(CH_2CH_2O)_X$—H] in terms of interaction with a coloring material or resin particles.

In the present invention, "the number of Rs per molecule" means the total number of repeating structures of the alkyleneoxy group contained in one molecule of the polyhydric alcohol compound in the present invention. In the present invention, the number of Rs per molecule is required to be 40 or more and 120 or less when the polyhydric alcohol is a trihydric alcohol and is required to be 12 or more and 400 or less when the polyhydric alcohol is a tetrahydric or higher polyhydric alcohol. The number of Rs per molecule is preferably 50 or more and 120 or less when the polyhydric alcohol is a tetrahydric alcohol and is preferably 40 or more and 400 or less when the polyhydric alcohol is a pentahydric or higher and dodecahydric or lower polyhydric alcohol.

In the present invention, "the trihydric or higher polyhydric alcohol compound having a group formed by substituting the hydrogen atom of a hydroxyl group by the structure represented by —$R_n$—H" is exemplified by the following compound, when the polyhydric alcohol is sorbitol, for example. In the formula, EtO represents an ethyleneoxy group, each of $n_1$ to $n_6$ is independently, preferably 1.25 or more, more preferably 2 or more, and particularly preferably 5 or more. The sum of $n_1$ to $n_6$ (or the number of Rs per molecule) is 12 or more and 400 or less.

[Chemical Formula 1]

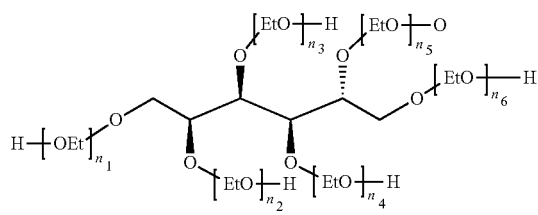

Content of Polyhydric Alcohol Compound (1) First Invention

In the first invention, the polyhydric alcohol compound in which the hydrogen atom of a hydroxyl group is substituted by the structure represented by —$R_n$—H (where R is an alkyleneoxy group including an ethyleneoxy group; the number of Rs per molecule is 40 or more and 120 or less when the polyhydric alcohol is a trihydric alcohol and is 12 or more and 400 or less when the polyhydric alcohol is a tetrahydric or higher polyhydric alcohol) (hereinafter also simply referred to as "polyhydric alcohol compound") is used in an ink containing a coloring material and anionic resin particles.

In the first invention, the content of the polyhydric alcohol compound is preferably 0.2% by mass or more and more preferably 0.6% by mass or more and is preferably 10.0% by mass or less based on the total mass of the ink.

In the first invention, the mass ratio of the content of the anionic resin particles relative to the content of the polyhydric alcohol compound based on the total mass of the ink is preferably 0.5 times or more and 25.0 times or less, more preferably 0.5 times or more and 8.0 times or less, and even more preferably 0.5 times or more and 5.0 times or less in terms of mass ratio. When the mass ratio is within this range, the image shift mentioned above can be further suppressed.

(2) Second Invention

In the second invention, the polyhydric alcohol compound is used in a liquid composition that destabilizes the dispersion state of the coloring material or of the anionic resin particles in the ink.

In the second invention, the content of the polyhydric alcohol compound is preferably 5.0% by mass or more, more preferably 20.0% by mass or more, and particularly preferably 20.0% by mass or more and 70.0% by mass or less based on the total mass of the liquid composition.

In the second invention, the mass ratio of the application amount of the anionic resin particles derived from the ink relative to the application amount of the polyhydric alcohol compound derived from the liquid composition with respect to a recording medium is preferably 0.3 times or more and 60.0 times or less and more preferably 0.5 times or more and 40.0 times or less in terms of mass ratio. When the mass ratio is within this range, the image shift mentioned above can be further suppressed.

(3) Third Invention

In the third invention, the polyhydric alcohol compound is used in a clear ink containing anionic resin particles.

In the third invention, the content of the polyhydric alcohol compound is preferably 0.2% by mass or more, and more preferably 0.5% by mass or more and 10.0% by mass or less based on the total mass of the clear ink.

In the third invention, the mass ratio of the content of the anionic resin particles relative to the content of the polyhydric alcohol compound based on the total mass of the clear ink is preferably 0.5 times or more and 25.0 times or less, more preferably 0.5 times or more and 8.0 times or less, and even more preferably 0.5 times or more and 5.0 times or less in terms of mass ratio. When the mass ratio is within the range, the image shift mentioned above can be further suppressed.

Ink

In the present invention, the ink contains a coloring material and anionic resin particles. The ink can further contain an aqueous medium and other components. The materials usable in the ink will next be described. In the following description, "(meth)acrylic acid" and "(meth)acrylate" mean "acrylic acid, methacrylic acid" and "acrylate, methacrylate", respectively.

Coloring Material

The coloring material of the present invention is exemplified by known pigments and dyes.

Specifically, the coloring material is preferably the pigment from the viewpoint of weatherability and image quality.

In the present invention, the content of the coloring material in the ink is preferably 0.5% by mass or more and 15.0% by mass or less, and more preferably 1.0% by mass or more and 10.0% by mass or less based on the total mass of the ink.

The pigment is exemplified by resin-dispersion type pigments containing a resin as a dispersant (including resin-dispersed pigments containing a resin dispersant, microcapsule pigments in which the surface of pigment particles is covered with a resin, and resin-bonded pigments in which an organic group containing a resin is chemically bonded to the surface of pigment particles) and self-dispersion type pigments (self-dispersible pigments) in which hydrophilic groups are introduced onto the surface of pigment particles, which are classified in terms of dispersion manner. Pigments with different dispersion manners can naturally be used in combination. Carbon black or an organic pigment is preferably used as a specific pigment. These pigments can be used singly or in combination of two or more of them. When the pigment used in the ink is the resin-dispersion type pigment, a resin is used as a dispersant. The resin used as the dispersant preferably has both a hydrophilic moiety and a hydrophobic moiety. Specific examples of the resin include acrylic resins prepared by polymerization of a monomer having a carboxyl group, such as acrylic acid and methacrylic acid; and urethane resins prepared by polymerization of a diol having an anionic group, such as dimethylolpropionic acid. The resin used as the dispersant preferably has an acid value of 50 mg KOH/g or more and 550 mg KOH/g or less. The resin used as the dispersant preferably has a weight average molecular weight (Mw) of 1,000 or more and 50,000 or less which is determined by GPC in terms of polystyrene. The content of the resin dispersant in the ink is preferably 0.1% by mass or more and 10.0% by mass or less and more preferably 0.2% by mass or more and 4.0% by mass or less based on the total mass of the ink. The mass ratio of the content of the resin dispersant relative to the content of the pigment is preferably 0.1 times or more and 3.0 times or less in terms of mass ratio.

Anionic Resin Particles

In the present invention, the "resin particles" mean a resin present in the state of particles having a particle size and dispersed in a solvent. In the present invention, the resin particles preferably have a 50% cumulative volume average particle diameter ($D_{50}$) of 10 nm or more and 1,000 nm or less. The resin particles more preferably have a $D_{50}$ of 40 nm or more and 500 nm or less and even more preferably 50 nm or more and 500 nm or less. In the present invention, the $D_{50}$ of resin particles is determined by the following procedure. A resin particle dispersion is diluted 50 times (in terms of volume) with pure water, and the diluted dispersion is subjected to measurement with an UPA-EX150 (manufactured by NIKKISO CO., LTD.) under measurement conditions of a SetZero of 30 s, a number of measurements of three times, a measurement time of 180 seconds, and a refractive index of 1.5.

The resin particles preferably have a weight average molecular weight of 1,000 or more and 2,000,000 or less which is determined by gel permeation chromatography (GPC) in terms of polystyrene.

The minimum film-forming temperature of the resin particles is preferably 20 degree C. or more and 200 degree C. or less and more preferably 20 degree C. or more and 100 degree C. or less. The determination method of the minimum film-forming temperature of the resin particles in the present invention is in accordance with JIS K 6828-2, "Determination of minimum film-forming temperature".

In the image recording methods of the first to third inventions, the content (% by mass) of the resin particles in the ink is preferably 1.0% by mass or more based on the total mass of the ink. The content of the resin particles is more preferably 3% by mass or more and even more preferably 5% by mass or more and 15% by mass or less.

In the present invention, any resin particles satisfying the above definition of the resin particles can be used in the ink. As the monomer used for the resin particles, any monomers polymerizable by emulsion polymerization, suspension polymerization, dispersion polymerization, or a similar method can be used. Examples of the resin particles include acrylic resin particles, vinyl acetate resin particles, ester resin particles, ethylene resin particles, urethane resin particles, synthetic rubber particles, vinyl chloride resin particles, vinylidene chloride resin particles, and olefinic resin particles, which are classified in terms of the difference in monomer. Among them, acrylic resin particles or urethane resin particles are preferably used.

Examples of the monomer specifically usable for the acrylic resin particles include α,β-unsaturated carboxylic acids such as (meth)acrylic acid, maleic acid, crotonic acid, angelic acid, itaconic acid, and fumaric acid and salts thereof; ester compounds of α,β-unsaturated carboxylic acids, such as ethyl (meth)acrylate, methyl (meth)acrylate, butyl (meth)acrylate, methoxyethyl (meth)acrylate, ethoxyethyl (meth)acrylate, diethylene glycol (meth)acrylate, triethylene glycol (meth)acrylate, tetraethylene glycol (meth)acrylate, polyethylene glycol (meth)acrylate, methoxydiethylene glycol (meth)acrylate, methoxytriethylene glycol (meth)acrylate, methoxytetraethylene glycol (meth)acrylate, methoxypolyethylene glycol (meth)acrylate, cyclohexyl (meth)acrylate, isobornyl (meth)acrylate, N,N-dimethylaminopropyl (meth)acrylate, monobutyl maleate, and dimethyl itaconate; alkyl amide compounds of α,β-unsaturated carboxylic acids, such as (meth)acrylamide, dimethyl(meth)acrylamide, N,N-dimethylethyl(meth)acrylamide, N,N-dimethylpropyl(meth)acrylamide, isopropyl (meth)acrylamide, diethyl(meth)acrylamide, (meth)acryloylmorpholine, maleic acid monoamide, and crotonic acid methylamide; α,β-ethylenically unsaturated compounds having an aryl group, such as styrene, α-methylstyrene, vinyl phenylacetate, benzyl (meth)acrylate, and 2-phenoxyethyl (meth)acrylate; and ester compounds of polyfunctional alcohols, such as ethylene glycol diacrylate and polypropylene glycol dimethacrylate. Such an acrylic resin may be a homopolymer prepared by polymerization of a single monomer or a copolymer prepared by polymerization of two or more monomers. When the resin particles are a copolymer, the copolymer may be a random copolymer or a block copolymer. Specifically preferred are resin particles prepared by using hydrophilic monomers and hydrophobic monomers. The hydrophilic monomer is exemplified by α,β-unsaturated carboxylic acids and salts thereof, and the hydrophobic monomer is exemplified by ester compounds of α,β-unsaturated carboxylic acids and α,β-ethylenically unsaturated compounds having an aryl group. In particular, the anionic resin particles are preferably a polymer of a monomer composition containing at least one monomer selected from the group consisting of ester compounds of α,β-unsaturated carboxylic acids and α,β-ethylenically unsaturated compounds having an aryl group.

The urethane resin particles are resin particles synthesized by reacting a polyisocyanate which is a compound having two or more isocyanate groups with a polyol compound which is a compound having two or more hydroxyl groups. In the present invention, any urethane resin particles that are prepared by reacting a known polyisocyanate compound with a known polyol compound can be used as long as the requirements for the resin particles are satisfied.

Examples of the resin particles include resin particles having a single layer structure and resin particles having a multi-layered structure such as a core-shell structure, which are classified in terms of structure. In the present invention, resin particles having a multi-layered structure are preferably used. In particular, resin particles having a core-shell structure are more preferably used. When resin particles have a core-shell structure, the core part and the shell part function in clearly different ways. Resin particles having such a core-shell structure have an advantage of capable of imparting more functions to an ink than those having a single layer structure.

Aqueous Medium

The ink of the present invention can contain an aqueous medium which is water or a mixed solvent of water and a water-soluble organic solvent. The content of the water-soluble organic solvent is preferably 3.0% by mass or more and 50.0% by mass or less based on the total mass of the ink. As the water-soluble organic solvent, any of the conventionally, generally used water-soluble organic solvents can be used. Examples of the water-soluble organic solvent include alcohols, glycols, alkylene glycols having an alkylene group with 2 to 6 carbon atoms, polyethylene glycols, nitrogen-containing compounds, and sulfur-containing compounds. These water-soluble organic solvents can be used singly or in combination of two or more of them, as necessary. As the water, a deionized water (ion-exchanged water) is preferably used. The content of the water is preferably 50.0% by mass or more and 95.0% by mass or less based on the total mass of the ink.

Other Components

The ink of the present invention can also contain water-soluble organic compounds that are solid at normal temperature, including polyhydric alcohols such as trimethylolpropane and trimethylolethane and urea derivatives such as urea and ethylene urea, as necessary, in addition to the above-mentioned components. The ink and the liquid composition of the present invention can further contain various additives such as surfactants, pH adjusters, anticorrosives, antiseptic agents, antifungal agents, antioxidants, reduction inhibitors, evaporation accelerators, chelating agents, and resins, as necessary.

Liquid Composition

In the present invention, the liquid composition destabilizes the dispersion state of the pigment or of the anionic resin particles in the ink. Specifically, the liquid composition preferably contains a reactant exhibiting such an action. The liquid composition can further contain an aqueous medium and other components. The application amount of the liquid composition is preferably 0.1 g/m$^2$ or more and 10.0 g/m$^2$ or less.

In the present invention, the liquid composition is preferably colorless, milky white, or white so as not to affect an image recorded with the ink. On this account, the ratio of a maximum absorbance to a minimum absorbance (maximum absorbance/minimum absorbance) is preferably 1.0 or more and 2.0 or less in a wavelength region of from 400 nm to 800 nm, which is the wavelength region of visible light. This means that the liquid composition has substantially no absorbance peak in the visible light wavelength region, or that if the liquid composition has a peak, the intensity of the peak is extremely small. In addition, the liquid composition preferably contains no coloring material in the present invention. The absorbance can be determined by using an undiluted liquid composition with a Hitachi double beam spectrophotometer, U-2900 (manufactured by Hitachi High-Technologies Corporation). In the measurement, the liquid composition can be diluted and subjected to absorbance measurement. This is because both the maximum absorbance and the minimum absorbance of a liquid composition are proportionate to a dilution ratio and thus the ratio of the maximum absorbance to the minimum absorbance (maximum absorbance/minimum absorbance) does not depend on the dilution ratio.

The material usable in the liquid composition will next be described.

Reactant

In the present invention, the liquid composition contains such a reactant as to precipitate/aggregate components in the ink (such as a coloring material and a resin). The reactant may be a conventionally known compound. Specifically preferably used is at least one substance selected from polyvalent metal ions and organic acids. A plurality of types of reactants are also preferably contained in the liquid composition.

Specific examples of the polyvalent metal ion include divalent metal ions such as $Ca^{2+}$, $Cu^{2+}$, $Ni^{2+}$, $Mg^{2+}$, $Sr^{2+}$, $Ba^{2+}$, and $Zn^{2+}$; and trivalent metal ions such as $Fe^{3+}$, $Cr^{3+}$, $Y^{3+}$, and $Al^{3+}$. In the present invention, the polyvalent metal ion can be added in a salt form such as hydroxides and chlorides, which are dissociated to form ions to be utilized. In the present invention, the content of the polyvalent metal ion is preferably 3% by mass or more and 90% by mass or less based on the total mass of the liquid composition.

Specific examples of the organic acid include oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidonecarboxylic acid, pyronecarboxylic acid, pyrrolecarboxylic acid, furancarboxylic acid, pyridinecarboxylic acid, coumaric acid, thiophenecarboxylic acid, nicotinic acid, oxysuccinic acid, and dioxysuccinic acid. In the present invention, the content of the organic acid is preferably 3% by mass or more and 99% by mass or less based on the total mass of the liquid composition.

Aqueous Medium

The liquid composition of the present invention can contain an aqueous medium which is water or a mixed solvent of water and a water-soluble organic solvent. The content of the water-soluble organic solvent is preferably 3.0% by mass or more and 50.0% by mass or less based on the total mass of the liquid composition. As the water-soluble organic solvent, any of the conventionally, generally used water-soluble organic solvents can be used. Examples of the water-soluble organic solvent include alcohols, glycols, alkylene glycols having an alkylene group with 2 to 6 carbon atoms, polyethylene glycols, nitrogen-containing compounds, and sulfur-containing compounds. These water-soluble organic solvents can be used singly or in combination of two or more of them, as necessary. As the water, a deionized water (ion-exchanged water) is preferably used. The content of the water is preferably 50.0% by mass or more and 95.0% by mass or less based on the total mass of the liquid composition.

Other Components

The liquid composition can also contain water-soluble organic compounds that are solid at normal temperature, including polyhydric alcohols such as trimethylolpropane and trimethylolethane and urea derivatives such as urea and ethylene urea, as necessary, in addition to the above-mentioned components. The ink and the liquid composition of the present invention can further contain various additives such as surfactants, pH adjusters, anticorrosives, antiseptic agents, antifungal agents, antioxidants, reduction inhibitors, evaporation accelerators, chelating agents, and resins, as necessary.

In particular, the liquid composition preferably contains resin particles such as acrylic resin particles, urethane resin particles, and polyolefin resin particles; inorganic particles such as silica particles, titania particles, alumina particles, and zirconia particles; and a silicone oil and a fluorine oil, for example, in order to impart strength and slidability to a resulting image to improve the anti-scratching properties. The content of such a material is preferably 1% by mass or more and 30% by mass or less based on the total mass of the liquid composition.

Image Recording Method

In the present invention, the ink and the liquid composition described above are used to record an image. The image recording method of the present invention is exemplified by "direct drawing type image recording method" in which an ink and a liquid composition are directly applied to a recording medium to record an image and "intermediate transfer type image recording method" in which an ink and a liquid composition are applied to an intermediate transfer member as a recording medium to form an intermediate image and then the intermediate image is transferred to a recording medium such as paper to form an image. The respective image recording methods will next be described.

[1] Direct Drawing Type Image Recording Method

The direct drawing type image recording method includes an ink application step (A) of applying an ink to a recording medium and a liquid composition application step (B) of applying a liquid composition to the recording medium so as to at least partly overlap with an area where the ink is applied. The method may further includes a fixing step of pressurizing the recording medium on which an image has been recorded in the steps (A) and (B) with a roller.

In the present invention, after the step (A), the step (B) can be performed, or after the step (B), the step (A) can be performed. When the same step is performed twice or more, for example, the method can be carried out in the order of the step (A), the step (B), and the step (A) or can be carried out in the order of the step (B), the step (A), and the step (B). In particular, a method including a process in which the step (B) is performed and then the step (A) is performed produces a larger effect of improving image quality and thus is more preferred.

Ink Application Step

The means of applying the ink to the recording medium is preferably an ink jet recording method including a step of ejecting an ink from an ink jet recording head in response to recording signals to conduct recording on a recording medium. Particularly preferred is an ink jet recording method in which thermal energy is applied to an ink and the ink is ejected from an ejection orifice of a recording head.

Liquid Composition Application Step

The means of applying the liquid composition to the recording medium is exemplified by an ink jet system and a coating system. The coating system is exemplified by roller coating, bar coating, and spray coating.

Fixing Step

In the fixing step, pressurization can improve smoothness of an image. In this step, a roller is preferably heated when a recording medium is pressurized with the roller. Pressurization with a heated roller can improve toughness of an image. In addition, by controlling the heating temperature, the glossiness of a resulting image can be adjusted.

Recording Medium

In the direct drawing type image recording method, the recording medium includes papers commonly used for printing and also widely encompasses fabrics, plastics, films, and similar materials. The recording medium used in the image recording method of the present invention may be a recording medium cut into a desired size in advance. The recording medium may also be a rolled sheet, which is cut into a desired size after image recording.

[2] Intermediate Transfer Type Image Recording Method

In the intermediate transfer type image recording method, "intermediate transfer member" corresponds to "recording medium". Accordingly, a recording medium such as paper onto which an intermediate image is finally transferred is regarded as "transfer medium" in the following description.

FIGURE is a schematic view showing an example of the intermediate transfer type image recording method. In FIGURE, an intermediate transfer member 10 includes a rotatable drum-shaped support member 12 and a surface layer member 11 provided on the outer peripheral surface of the support member 12. The intermediate transfer member 10 (support member 12) is rotationally driven in the arrow direction (in the counterclockwise direction shown in the FIGURE) around a rotating shaft 13 as the center. Each member arranged around the intermediate transfer member 10 is configured to work in such a way as to be synchronized with the rotation of the intermediate transfer member 10. A liquid composition is applied to the intermediate transfer member 10 with a coating roller 14, for example. An ink is applied from ink jet recording heads 15, and the mirror-inverted intermediate image of an intended image is formed on the intermediate transfer member 10. Next, the temperature of the intermediate image formed on the intermediate transfer member 10 may be controlled to a desired temperature by a temperature control mechanism 17. At this time, the liquid in the intermediate image formed on the intermediate transfer member 10 may be removed by a liquid removal mechanism 16. Next, a pressure roller 19 is used to bring a transfer medium 18 into contact with the intermediate transfer member 10, and thus the intermediate image is transferred to the transfer medium 18. For a step of washing the surface of the intermediate transfer member 10, a cleaning unit 20 may be provided. The intermediate transfer member and each step will next be described.

Intermediate Transfer Member

The intermediate transfer member is a recording medium which holds a liquid composition and an ink, and on the intermediate transfer member, an intermediate image is recorded. The intermediate transfer member is exemplified by a member including a support member which is handled in order to transmit a required force and including a surface layer member on which an intermediate image is recorded. The support member and the surface layer member may be integrated.

The shape of the intermediate transfer member is exemplified by a sheet shape, a roller shape, a drum shape, a belt shape, and an endless web shape. The size of the intermediate transfer member may be appropriately designed in accordance with the size of a recordable transfer medium.

The support member of the intermediate transfer member is required to have a certain strength from the viewpoint of the transfer accuracy and the durability thereof. The material for the support member is preferably metals, ceramics, and resins, for example. Specifically preferred are aluminum, iron, stainless steel, acetal resins, epoxy resins, polyimide, polyethylene, polyethylene terephthalate, nylon, polyurethane, silica ceramics, and alumina ceramics. A support member formed of such a material can achieve rigidity capable of withstanding the pressure during transfer and dimensional accuracy and can reduce the inertia during operation to improve the control responsivity. These materials can be used singly or in combination of two or more of them.

An intermediate image is transferred from the intermediate transfer member to a transfer medium such as paper, and thus the surface layer of the intermediate transfer member is required to have a certain elasticity. For example, when the case of using paper as the transfer medium is supposed, the surface layer of the intermediate transfer member preferably has a durometer A hardness (durometer type A hardness) of 10 degree or more and 100 degree or less and more preferably 20 degree or more and 60 degree or less, which are determined in accordance with JIS K6253. The material for the surface layer member constituting the surface layer of the intermediate transfer member is preferably metals, ceramics, and resins, for example. Specifically preferred are polybutadiene rubbers, nitrile rubbers, chloroprene rubbers, silicone rubbers, fluororubbers, fluorosilicone rubbers, urethane rubbers, styrenic elastomers, olefinic elastomers, polyvinyl chloride elastomers, ester elastomers, amide elastomers, polyether, polyester, polystyrene, polycarbonate, siloxane compounds, and perfluorocarbon compounds. The surface layer member may be formed by laminating a plurality of materials. Examples of such a member include a material prepared by laminating a silicone rubber on an endless-belt urethane rubber sheet, a material prepared by laminating a silicone rubber on a polyethylene terephthalate film, and a material prepared by forming a siloxane compound film on a urethane rubber sheet.

The surface of the intermediate transfer member may be subjected to a surface treatment. The surface treatment is exemplified by flame treatment, corona treatment, plasma treatment, polishing treatment, roughening treatment, active energy ray irradiation treatment, ozone treatment, surfactant treatment, and silane coupling treatment. These treatments may be carried out in combination.

In order to prevent flowing of the intermediate image on the intermediate transfer member, the surface of the intermediate transfer member preferably has an arithmetic average roughness of 0.01 µm or more and 3 µm or less, which is determined in accordance with JIS B 0601: 2001. The surface of the intermediate transfer member preferably has a water contact angle of 50 degree or more and 110 degree or less and more preferably 60 degree or more and 100 degree or less.

Ink Application Step

In the ink application step, an ink is applied to the intermediate transfer member. As the means of applying the ink to the intermediate transfer member, an ink jet system is preferably used. Particularly preferred is a system in which thermal energy is applied to an ink and the ink is ejected from an ejection orifice of a recording head.

As the ink jet recording head, a line head or a serial head can be used, for example. On the ink jet head of the line head system, ink ejection orifices are arranged in a direction orthogonal to the rotation direction of the intermediate transfer member (in the axis direction in the case of a drum type). The serial head is a head that is scanned in a direction orthogonal to the rotation direction of the intermediate transfer member for performing recording.

Liquid Composition Application Step

In the liquid composition application step, a liquid composition is applied to the intermediate transfer member. The means of applying the liquid composition to the intermediate transfer member is exemplified by coating systems such as a roller coating system, bar coating system, spray coating system and ink jet system. The coating system is particularly preferably used. In the intermediate transfer type image recording method, the liquid composition application step is preferably provided prior to the ink application step.

Liquid Removal Step

After the formation of an intermediate image by the application of the ink and the liquid composition and prior to the transfer step, a liquid removal step of removing the liquid from the intermediate image formed on the intermediate transfer member may be provided. If the intermediate image contains excess liquid, the excess liquid overflows, for example, in the transfer step to deteriorate the image quality of a resulting image in some cases. To address this, excess liquid is preferably removed from the intermediate image in the liquid removal step. The method of removing a liquid is exemplified by heating, blowing of low humidity air, decompressing, natural drying, and combination methods thereof.

Transfer Step

In the transfer step, by bringing a transfer medium into contact with the intermediate image recorded on the intermediate transfer member, the image is transferred from the intermediate transfer member to the transfer medium and is recorded on the transfer medium. When an intermediate image is transferred to the transfer medium, for example, a pressure roller is preferably used to pressurize the intermediate image from both sides of the intermediate transfer member and the transfer medium. The pressurization can improve the transfer efficiency. At this time, the pressurization can be performed in multiple steps.

As mentioned above, as high speed recording is increasingly demanded, high transfer efficiency is required to be achieved even at high transfer speeds. To satisfy such a requirement, the transfer speed, which means the conveying speed of the transfer medium in the present invention, is preferably 1.0 m/sec or more and more preferably 2.0 m/sec or more.

During the transfer, the intermediate image is preferably heated. The method of heating the intermediate image is exemplified by a method of heating the pressure roller at a predetermined transfer temperature and a method of providing a heater separately. The heating temperature of the pressure roller in the transfer step is preferably set according to resin particles used and is more preferably 25° C. or more and 200° C. or less.

The temperature when the intermediate image comes in contact with the recording medium is preferably not lower than the glass transition point of anionic resin particles, and the temperature when the intermediate image is released from the intermediate transfer member is preferably lower than the glass transition point of the anionic resin particles. When the temperature of the intermediate image in contact is not lower than the glass transition point of anionic resin particles, the flowability of the anionic resin particles increases to improve the adhesion between the recording medium and the intermediate image. When the temperature of the intermediate image is lower than the glass transition point of the anionic resin particles during the subsequent releasing, the anionic resin particles become in a glass state, and thus the interface between the intermediate image and the recording medium is unlikely to be separated. As a result, the transfer efficiency to the recording medium can be further improved. The temperature when the intermediate image comes in contact with the recording medium is the temperature of the intermediate image at the time when at least a part of the intermediate image comes in contact with the recording medium. The temperature when the intermediate image is released from the intermediate transfer member is the temperature of the intermediate image at the time when the entire intermediate image is transferred to the recording medium. The temperature of the intermediate image layer is a value determined by using an infrared radiation thermometer.

The difference between the temperature when the intermediate image comes in contact with the recording medium and the glass transition point of the anionic resin particles is preferably 0° C. or more and 35° C. or less and more preferably 10° C. or more and 35° C. or less. The difference between the temperature when the intermediate image is released from the intermediate transfer member and the glass transition point of the anionic resin particles is preferably 1° C. or more and 60° C. or less.

The temperature when the intermediate image comes in contact with the recording medium is preferably 50° C. or more and 140° C. or less. The temperature when the intermediate image is released from the intermediate transfer member is preferably 25° C. or more and 70° C. or less.

Transfer Medium

In the present invention, the transfer medium includes papers commonly used for printing and also widely encompasses fabrics, plastics, films, and similar materials. The transfer medium may be a transfer medium cut into a desired size in advance. The transfer medium may also be a rolled sheet, which is cut into a desired size after image recording.

Fixing Step

After the transfer step, a fixing step of pressurizing the transfer medium on which an intermediate image has been transferred with a roller may be provided. The pressurization can improve smoothness of an image.

When the transfer medium on which an image has been transferred is pressurized with a roller, the roller is preferably heated. Pressurization with a heated roller can improve toughness of an image. In addition, by controlling the heating temperature, the glossiness of a resulting image can be adjusted.

Cleaning Step

After the transfer step, a cleaning step of cleaning the surface of the intermediate transfer member may be provided. As the method of cleaning the intermediate transfer member, any conventional methods can be used. Specific examples of the method include a method of applying a shower of a cleaning solution to the intermediate transfer member, a method of bringing a wet molton roller into contact with the intermediate transfer member and wiping the intermediate transfer member, a method of bringing the intermediate transfer member into contact with the surface of a cleaning solution, a method of wiping a residue on the intermediate transfer member with a wiper blade, a method of applying various energies to the intermediate transfer member, and combination methods thereof.

EXAMPLES

The present invention will next be described in further detail with reference to examples and comparative examples. The present invention is not intended to be limited to the following examples unless going beyond the scope of the invention. In the following description in examples, "part" is based on mass unless otherwise noted.

Preparation of Ink

Preparation of Pigment Dispersion

Preparation of Black Pigment Dispersion

First, 10 parts of carbon black (product name: Monarch 1100, manufactured by Cabot Co.), 15 parts of aqueous resin solution (a styrene-ethyl acrylate-acrylic acid copolymer with an acid value of 150 and a weight average molecular weight of 8,000, the solution was prepared by neutralization of 20.0% by mass of aqueous resin solution with an aqueous potassium hydroxide solution), and 75 parts of pure water were mixed. The mixture was placed in a batch type vertical sand mill (manufactured by Aimex Co.), and 200 parts of 0.3-mm zirconia beads were placed. The mixture was subjected to dispersion treatment for 5 hours while being cooled with water. The dispersion liquid was centrifuged to remove coarse particles, giving a black pigment dispersion having a pigment content of 10.0% by mass.

Preparation of Cyan Pigment Dispersion

A cyan pigment dispersion having a pigment content of 10.0% by mass was prepared in the same manner as in the above (preparation of black pigment dispersion) except that C.I. Pigment Blue 15:3 was used in place of the carbon black.

Preparation of Magenta Pigment Dispersion

A magenta pigment dispersion having a pigment content of 10.0% by mass was prepared in the same manner as in the above (preparation of black pigment dispersion) except that C.I. Pigment Red 122 was used in place of the carbon black.

Preparation of Resin Particle Dispersion

Preparation of Resin Particle Dispersion 1

First, 20 parts of ethyl methacrylate, 3 parts of 2,2'-azobis-(2-methylbutyronitrile), and 2 parts of n-hexadecane were mixed, and the mixture was stirred for 0.5 hour. The mixture was added dropwise to 75 parts of an 8% aqueous solution of a styrene-butyl acrylate-acrylic acid copolymer (acid value: 130 mg KOH/g, weight average molecular weight: 7,000), and the whole was stirred for 0.5 hour. Next, the mixture was sonicated with a sonicator for 3 hours. Subsequently, the mixture was polymerized under a nitrogen atmosphere at 80° C. for 4 hours. The reaction mixture was cooled to room temperature and then filtered, giving a resin particle dispersion 1 having a resin content of 25.0% by mass.

Preparation of Resin Particle Dispersion 2

To a mixed solution of 51.9 parts of ion-exchanged water and 0.1 part of potassium persulfate, an emulsion prepared by mixing 35.0 parts of methyl methacrylate, 10.0 parts of methacrylic acid, and 3.0 parts of Nikkol BC15 (manufactured by Nikko Chemicals Co.) was added dropwise over 3 hours under a nitrogen atmosphere at 80° C. with stirring and the polymerization reaction was carried out. The reaction mixture was then cooled to room temperature, and ion-exchanged water and an aqueous potassium hydroxide solution were added thereto, giving a resin particle dispersion 2 having a resin content of 30.0% by mass.

Preparation of Polyhydric Alcohol Compound

The compounds shown in Table 1 were prepared.

TABLE 1

Structures of polyhydric alcohol compounds

| Compound No. | Original polyhydric alcohol compound | Type of General Formula | m | R | n | Number of Rs per molecule |
|---|---|---|---|---|---|---|
| Compound 1 | Sorbitol | General Formula A | 4 | Ethyleneoxy group | 2.0 | 12 |
| Compound 2 | | | | Ethyleneoxy group | 6.0 | 36 |
| Compound 3 | | | | Ethyleneoxy group | 10.0 | 60 |
| Compound 4 | | | | Ethyleneoxy group | 13.3 | 80 |
| Compound 5 | | | | Ethyleneoxy group | 20.0 | 120 |
| Compound 6 | | | | Ethyleneoxy group | 40.0 | 240 |
| Compound 7 | | | | Ethyleneoxy group | 66.7 | 400 |
| Compound 8 | | | | Ethyleneoxy group:Propyleneoxy group = 1:1 | 10.0 | 60 |
| Compound 9 | | | | Ethyleneoxy group:Propyleneoxy group = 1:1 | 20.0 | 120 |
| Compound 10 | | | | Ethyleneoxy group:Propyleneoxy group = 4:3 | 23.3 | 140 |
| Compound 11 | | | | Ethyleneoxy group:Propyleneoxy group = 1:1 | 40.0 | 240 |
| Compound 12 | Xylitol | | 3 | Ethyleneoxy group | 16.0 | 80 |
| Compound 13 | Erythritol | | 2 | Ethyleneoxy group | 15.0 | 60 |
| Compound 14 | Mannitol | | 4 | Ethyleneoxy group | 13.3 | 80 |
| Compound 15 | Dipentaerythritol | General Formula B | — | Ethyleneoxy group | 13.3 | 80 |
| Compound 16 | Glycerol | General Formula C | 1 | Ethyleneoxy group:Propyleneoxy group = 1:1 | 16.0 | 48 |
| Compound 17 | Diglycerol | | 2 | Ethyleneoxy group | 5.0 | 20 |
| Compound 18 | Diglycerol | | | Ethyleneoxy group | 10.0 | 40 |
| Compound 19 | Diglycerol | | | Ethyleneoxy group | 15.0 | 60 |
| Compound 20 | Polyglycerol (tetramer of glycerol) | | 4 | Ethyleneoxy group | 10.0 | 60 |
| Compound 21 | Polyglycerol (tetramer of glycerol) | | | Ethyleneoxy group | 13.3 | 80 |
| Compound 22 | Polyglycerol (tetramer of glycerol) | | | Ethyleneoxy group | 20.0 | 120 |
| Compound 23 | Polyglycerol (hexamer of glycerol) | | 6 | Ethyleneoxy group | 5.0 | 40 |
| Compound 24 | Polyglycerol (hexamer of glycerol) | | | Ethyleneoxy group | 10.0 | 80 |
| Compound 25 | Polyglycerol (hexamer of glycerol) | | | Ethyleneoxy group | 15.0 | 120 |

TABLE 1-continued

Structures of polyhydric alcohol compounds

| Compound No. | Original polyhydric alcohol compound | Type of General Formula | m | R | n | Number of Rs per molecule |
|---|---|---|---|---|---|---|
| Compound 26 | Polyglycerol (decamer of glycerol) | | 10 | Ethyleneoxy group | 5.0 | 60 |
| Compound 27 | Trimethylolethane | General Formula D | — | Ethyleneoxy group | 4.0 | 12 |
| Compound 28 | Sorbitol | General Formula A | 4 | Ethyleneoxy group | 1.0 | 6 |
| Compound 29 | | | | Ethyleneoxy group | 1.7 | 10 |
| Compound 30 | | | | Ethyleneoxy group | 75.0 | 450 |
| Compound 31 | | | | Propyleneoxy group | 4.2 | 25 |
| Compound 32 | Polyglycerol (tetramer of glycerol) | General Formula C | 4 | — | 0 | 0 |
| Compound 33 | Glycerol | | 1 | Propyleneoxy group | 1.0 | 3 |
| Compound 34 | Glycerol | | | Propyleneoxy group | 1.7 | 5 |
| Compound 35 | Glycerol | | | Ethyleneoxy group | 5.0 | 15 |
| Compound 36 | Diglycerol | | 2 | Ethyleneoxy group | 2.5 | 10 |
| Compound 37 | Polyglycerol (dodecamer of glycerol) | | 12 | Ethyleneoxy group | 5.7 | 80 |

In Table 1, "ethyleneoxy group:propyleneoxy group=1:1, 4:3" means that the molar ratio of the ethyleneoxy group and the propyleneoxy group contained in R is 1:1, 4:3. In Table 1, General Formulae A to D of the polyhydric alcohol compounds are as shown below.

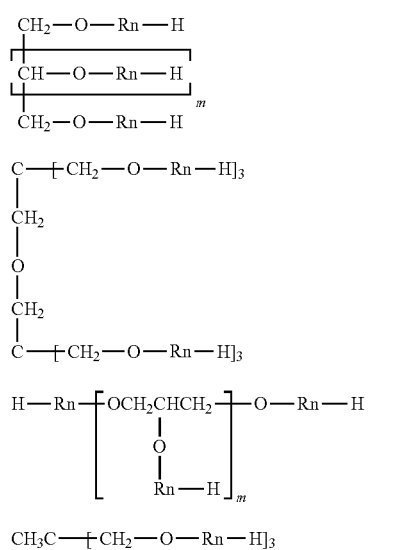

General Formula A

General Formula B

General Formula C

General Formula D

Preparation of Ink

Preparation of Black Ink

The resin particle dispersion and the pigment dispersion obtained in the above were mixed with the components shown below. The remainder of ion-exchanged water is such an amount that the total amount of all the components constituting the ink becomes 100.0% by mass.

| | |
|---|---|
| Pigment dispersion (coloring material content: 10.0% by mass) | 40.0% by mass |
| Resin particle dispersion | A % by mass in Table 2 |
| Glycerol | 7.0% by mass |

-continued

| | |
|---|---|
| Polyethylene glycol (number average molecular weight: 1,000) | 3.0% by mass |
| Polyhydric alcohol compound | B % by mass in Table 2 |
| Surfactant: Acetylenol E100 (manufactured by Kawaken Fine Chemicals Co.) | 0.5% by mass |
| Ion-exchanged water | remainder |

The mixture was thoroughly stirred and dispersed and then subjected to pressure filtration through a microfilter with a pore size of 3.0 μm (manufactured by Fujifilm Co.), giving each black ink.

TABLE 2

Preparation conditions of black inks

| | Resin particle dispersion | | Polyhydric alcohol compound | |
|---|---|---|---|---|
| Black ink No. | Type | Content A (% by mass) | Type | Content B (% by mass) |
| Black ink 1 | Resin particle dispersion 1 | 20.0 | Compound 1 | 1.0 |
| Black ink 2 | Resin particle dispersion 1 | 20.0 | Compound 2 | 1.0 |
| Black ink 3 | Resin particle dispersion 1 | 20.0 | Compound 3 | 1.0 |
| Black ink 4 | Resin particle dispersion 1 | 20.0 | Compound 4 | 1.0 |
| Black ink 5 | Resin particle dispersion 1 | 20.0 | Compound 5 | 1.0 |
| Black ink 6 | Resin particle dispersion 1 | 20.0 | Compound 6 | 1.0 |
| Black ink 7 | Resin particle dispersion 1 | 20.0 | Compound 7 | 1.0 |
| Black ink 8 | Resin particle dispersion 1 | 20.0 | Compound 8 | 1.0 |
| Black ink 9 | Resin particle dispersion 1 | 20.0 | Compound 9 | 1.0 |
| Black ink 10 | Resin particle dispersion 1 | 20.0 | Compound 10 | 1.0 |
| Black ink 11 | Resin particle dispersion 1 | 20.0 | Compound 11 | 1.0 |
| Black ink 12 | Resin particle dispersion 1 | 20.0 | Compound 12 | 1.0 |
| Black ink 13 | Resin particle dispersion 1 | 20.0 | Compound 13 | 1.0 |

TABLE 2-continued

Preparation conditions of black inks

| Black ink No. | Resin particle dispersion Type | Content A (% by mass) | Polyhydric alcohol compound Type | Content B (% by mass) |
|---|---|---|---|---|
| Black ink 14 | Resin particle dispersion 1 | 20.0 | Compound 14 | 1.0 |
| Black ink 15 | Resin particle dispersion 1 | 20.0 | Compound 15 | 1.0 |
| Black ink 16 | Resin particle dispersion 1 | 20.0 | Compound 16 | 1.0 |
| Black ink 17 | Resin particle dispersion 1 | 20.0 | Compound 17 | 1.0 |
| Black ink 18 | Resin particle dispersion 1 | 20.0 | Compound 18 | 1.0 |
| Black ink 19 | Resin particle dispersion 1 | 20.0 | Compound 19 | 1.0 |
| Black ink 20 | Resin particle dispersion 1 | 20.0 | Compound 20 | 1.0 |
| Black ink 21 | Resin particle dispersion 1 | 20.0 | Compound 21 | 1.0 |
| Black ink 22 | Resin particle dispersion 1 | 20.0 | Compound 22 | 1.0 |
| Black ink 23 | Resin particle dispersion 1 | 20.0 | Compound 23 | 1.0 |
| Black ink 24 | Resin particle dispersion 1 | 20.0 | Compound 24 | 1.0 |
| Black ink 25 | Resin particle dispersion 1 | 20.0 | Compound 25 | 1.0 |
| Black ink 26 | Resin particle dispersion 1 | 20.0 | Compound 26 | 1.0 |
| Black ink 27 | Resin particle dispersion 1 | 20.0 | Compound 27 | 1.0 |
| Black ink 28 | Resin particle dispersion 1 | 20.0 | Compound 4 | 0.2 |
| Black ink 29 | Resin particle dispersion 1 | 20.0 | Compound 4 | 0.6 |
| Black ink 30 | Resin particle dispersion 1 | 20.0 | Compound 4 | 3.0 |
| Black ink 31 | Resin particle dispersion 1 | 20.0 | Compound 4 | 5.0 |
| Black ink 32 | Resin particle dispersion 1 | 20.0 | Compound 4 | 10.0 |
| Black ink 33 | Resin particle dispersion 1 | 20.0 | Compound 4 | 20.0 |
| Black ink 34 | Resin particle dispersion 1 | 4.0 | Compound 4 | 1.0 |
| Black ink 35 | Resin particle dispersion 1 | 12.0 | Compound 4 | 1.0 |
| Black ink 36 | Resin particle dispersion 1 | 40.0 | Compound 4 | 3.0 |
| Black ink 37 | Resin particle dispersion 1 | 20.0 | — | 0 |
| Black ink 38 | Resin particle dispersion 1 | 4.0 | — | 0 |
| Black ink 39 | Resin particle dispersion 1 | 12.0 | — | 0 |
| Black ink 40 | Resin particle dispersion 1 | 40.0 | — | 0 |
| Black ink 41 | Resin particle dispersion 2 | 16.5 | Compound 4 | 1.0 |
| Black ink 42 | — | 0 | Compound 4 | 1.0 |
| Black ink 43 | Resin particle dispersion 1 | 2.0 | Compound 4 | 1.0 |
| Black ink 44 | Resin particle dispersion 1 | 20.0 | — | 0 |
| Black ink 45 | Resin particle dispersion 1 | 2.0 | — | 0 |
| Black ink 46 | Resin particle dispersion 1 | 20.0 | Compound 28 | 1.0 |
| Black ink 47 | Resin particle dispersion 1 | 20.0 | Compound 29 | 1.0 |
| Black ink 48 | Resin particle dispersion 1 | 20.0 | Compound 30 | 1.0 |
| Black ink 49 | Resin particle dispersion 1 | 20.0 | Compound 31 | 1.0 |
| Black ink 50 | Resin particle dispersion 1 | 20.0 | Compound 32 | 1.0 |
| Black ink 51 | Resin particle dispersion 1 | 20.0 | Compound 33 | 1.0 |
| Black ink 52 | Resin particle dispersion 1 | 20.0 | Compound 34 | 1.0 |
| Black ink 53 | Resin particle dispersion 1 | 20.0 | Compound 35 | 1.0 |
| Black ink 54 | Resin particle dispersion 1 | 20.0 | Compound 36 | 1.0 |
| Black ink 55 | Resin particle dispersion 1 | 20.0 | Compound 37 | 1.0 |

Preparation of Cyan Ink and Magenta Ink

Each of cyan inks 1 to 55 and magenta inks 1 to was prepared in the same manner as in the above (preparation of black ink) except that the cyan pigment dispersion or the magenta pigment dispersion was used in place of the black pigment dispersion.

Preparation of Liquid Composition

The components shown in Table 3 were mixed, and the mixture was thoroughly stirred and subjected to dispersion treatment. The mixture was then subjected to pressure filtration through a microfilter with a pore size of 3.0 μm (manufactured by Fujifilm Co.), giving each liquid composition. In the table, "AE100" is Acetylenol E100 (manufactured by Kawaken Fine Chemicals Co.), which is a nonionic surfactant prepared by addition reaction of ethylene oxide to acetylene glycol, and "F444" is MEGAFACE F 444 (manufactured by DIC Co.), which is a perfluoroalkyl ethylene oxide adduct.

TABLE 3

Preparation conditions of liquid compositions

| Liquid composition No. | Reactant Type | Content (% by mass) | Polyhydric alcohol compound Type | Content (% by mass) | KOH Content (% by mass) | Surfactant Type | Content (% by mass) | Water Content (% by mass) |
|---|---|---|---|---|---|---|---|---|
| Liquid composition 1 | Glutaric acid | 21.0 | — | 0.0 | 3.0 | AE100 | 1.0 | 75.0 |
| Liquid composition 2 | Levulinic acid | 42.0 | — | 0.0 | 3.0 | AE100 | 1.0 | 54.0 |
| Liquid composition 3 | Malonic acid | 21.0 | — | 0.0 | 3.0 | AE100 | 1.0 | 75.0 |
| Liquid composition 4 | Citric acid | 21.0 | — | 0.0 | 3.0 | AE100 | 1.0 | 75.0 |
| Liquid composition 5 | $CaCl_2$ | 21.0 | — | 0.0 | 0.0 | AE100 | 1.0 | 78.0 |
| Liquid composition 6 | Glutaric acid | 21.0 | Compound 1 | 40.0 | 3.0 | AE100 | 1.0 | 35.0 |
| Liquid composition 7 | Glutaric acid | 21.0 | Compound 2 | 40.0 | 3.0 | AE100 | 1.0 | 35.0 |

TABLE 3-continued

Preparation conditions of liquid compositions

| Liquid composition No. | Reactant Type | Content (% by mass) | Polyhydric alcohol compound Type | Content (% by mass) | KOH Content (% by mass) | Surfactant Type | Content (% by mass) | Water Content (% by mass) |
|---|---|---|---|---|---|---|---|---|
| Liquid composition 8 | Glutaric acid | 21.0 | Compound 3 | 40.0 | 3.0 | AE100 | 1.0 | 35.0 |
| Liquid composition 9 | Glutaric acid | 21.0 | Compound 4 | 40.0 | 3.0 | AE100 | 1.0 | 35.0 |
| Liquid composition 10 | Glutaric acid | 21.0 | Compound 5 | 40.0 | 3.0 | AE100 | 1.0 | 35.0 |
| Liquid composition 11 | Glutaric acid | 21.0 | Compound 6 | 40.0 | 3.0 | AE100 | 1.0 | 35.0 |
| Liquid composition 12 | Glutaric acid | 21.0 | Compound 7 | 40.0 | 3.0 | AE100 | 1.0 | 35.0 |
| Liquid composition 13 | Glutaric acid | 21.0 | Compound 8 | 40.0 | 3.0 | AE100 | 1.0 | 35.0 |
| Liquid composition 14 | Glutaric acid | 21.0 | Compound 9 | 40.0 | 3.0 | AE100 | 1.0 | 35.0 |
| Liquid composition 15 | Glutaric acid | 21.0 | Compound 10 | 40.0 | 3.0 | AE100 | 1.0 | 35.0 |
| Liquid composition 16 | Glutaric acid | 21.0 | Compound 11 | 40.0 | 3.0 | AE100 | 1.0 | 35.0 |
| Liquid composition 17 | Glutaric acid | 21.0 | Compound 12 | 40.0 | 3.0 | AE100 | 1.0 | 35.0 |
| Liquid composition 18 | Glutaric acid | 21.0 | Compound 13 | 40.0 | 3.0 | AE100 | 1.0 | 35.0 |
| Liquid composition 19 | Glutaric acid | 21.0 | Compound 14 | 40.0 | 3.0 | AE100 | 1.0 | 35.0 |
| Liquid composition 20 | Glutaric acid | 21.0 | Compound 15 | 40.0 | 3.0 | AE100 | 1.0 | 35.0 |
| Liquid composition 21 | Glutaric acid | 21.0 | Compound 16 | 40.0 | 3.0 | AE100 | 1.0 | 35.0 |
| Liquid composition 22 | Glutaric acid | 21.0 | Compound 17 | 40.0 | 3.0 | AE100 | 1.0 | 35.0 |
| Liquid composition 23 | Glutaric acid | 21.0 | Compound 18 | 40.0 | 3.0 | AE100 | 1.0 | 35.0 |
| Liquid composition 24 | Glutaric acid | 21.0 | Compound 19 | 40.0 | 3.0 | AE100 | 1.0 | 35.0 |
| Liquid composition 25 | Glutaric acid | 21.0 | Compound 20 | 40.0 | 3.0 | AE100 | 1.0 | 35.0 |
| Liquid composition 26 | Glutaric acid | 21.0 | Compound 21 | 40.0 | 3.0 | AE100 | 1.0 | 35.0 |
| Liquid composition 27 | Glutaric acid | 21.0 | Compound 22 | 40.0 | 3.0 | AE100 | 1.0 | 35.0 |
| Liquid composition 28 | Glutaric acid | 21.0 | Compound 23 | 40.0 | 3.0 | AE100 | 1.0 | 35.0 |
| Liquid composition 29 | Glutaric acid | 21.0 | Compound 24 | 40.0 | 3.0 | AE100 | 1.0 | 35.0 |
| Liquid composition 30 | Glutaric acid | 21.0 | Compound 25 | 40.0 | 3.0 | AE100 | 1.0 | 35.0 |
| Liquid composition 31 | Glutaric acid | 21.0 | Compound 26 | 40.0 | 3.0 | AE100 | 1.0 | 35.0 |
| Liquid composition 32 | Glutaric acid | 21.0 | Compound 27 | 40.0 | 3.0 | AE100 | 1.0 | 35.0 |
| Liquid composition 33 | Glutaric acid | 21.0 | Compound 4 | 5.0 | 3.0 | AE100 | 1.0 | 70.0 |
| Liquid composition 34 | Glutaric acid | 21.0 | Compound 4 | 6.0 | 3.0 | AE100 | 1.0 | 69.0 |
| Liquid composition 35 | Glutaric acid | 21.0 | Compound 4 | 10.0 | 3.0 | AE100 | 1.0 | 65.0 |
| Liquid composition 36 | Glutaric acid | 21.0 | Compound 4 | 20.0 | 3.0 | AE100 | 1.0 | 55.0 |
| Liquid composition 37 | Glutaric acid | 21.0 | Compound 4 | 40.0 | 3.0 | AE100 | 1.0 | 35.0 |
| Liquid composition 38 | Glutaric acid | 21.0 | Compound 4 | 70.0 | 3.0 | AE100 | 1.0 | 5.0 |
| Liquid composition 39 | Glutaric acid | 21.0 | Compound 4 | 75.0 | 3.0 | AE100 | 1.0 | 0 |
| Liquid composition 40 | Glutaric acid | 21.0 | — | 0.0 | 3.0 | F444 | 5.0 | 71.0 |
| Liquid composition 41 | Glutaric acid | 21.0 | Compound 4 | 3.0 | 3.0 | AE100 | 1.0 | 72.0 |
| Liquid composition 42 | Glutaric acid | 21.0 | Compound 28 | 40.0 | 3.0 | AE100 | 1.0 | 35.0 |
| Liquid composition 43 | Glutaric acid | 21.0 | Compound 29 | 40.0 | 3.0 | AE100 | 1.0 | 35.0 |
| Liquid composition 44 | Glutaric acid | 21.0 | Compound 30 | 40.0 | 3.0 | AE100 | 1.0 | 35.0 |
| Liquid composition 45 | Glutaric acid | 21.0 | Compound 31 | 40.0 | 3.0 | AE100 | 1.0 | 35.0 |
| Liquid composition 46 | Glutaric acid | 21.0 | Compound 32 | 40.0 | 3.0 | AE100 | 1.0 | 35.0 |
| Liquid composition 47 | Glutaric acid | 21.0 | Compound 33 | 40.0 | 3.0 | AE100 | 1.0 | 35.0 |
| Liquid composition 48 | Glutaric acid | 21.0 | Compound 34 | 40.0 | 3.0 | AE100 | 1.0 | 35.0 |
| Liquid composition 49 | Glutaric acid | 21.0 | Compound 35 | 40.0 | 3.0 | AE100 | 1.0 | 35.0 |
| Liquid composition 50 | Glutaric acid | 21.0 | Compound 36 | 40.0 | 3.0 | AE100 | 1.0 | 35.0 |
| Liquid composition 51 | Glutaric acid | 21.0 | Compound 37 | 40.0 | 3.0 | AE100 | 1.0 | 35.0 |
| Liquid composition 52 | Glutaric acid | 21.0 | Compound 1 | 40.0 | 3.0 | F444 | 5.0 | 31.0 |
| Liquid composition 53 | Glutaric acid | 21.0 | Compound 2 | 40.0 | 3.0 | F444 | 5.0 | 31.0 |
| Liquid composition 54 | Glutaric acid | 21.0 | Compound 3 | 40.0 | 3.0 | F444 | 5.0 | 31.0 |
| Liquid composition 55 | Glutaric acid | 21.0 | Compound 4 | 40.0 | 3.0 | F444 | 5.0 | 31.0 |
| Liquid composition 56 | Glutaric acid | 21.0 | Compound 8 | 40.0 | 3.0 | F444 | 5.0 | 31.0 |
| Liquid composition 57 | Glutaric acid | 21.0 | Compound 9 | 40.0 | 3.0 | F444 | 5.0 | 31.0 |
| Liquid composition 58 | Glutaric acid | 21.0 | Compound 10 | 40.0 | 3.0 | F444 | 5.0 | 31.0 |
| Liquid composition 59 | Glutaric acid | 21.0 | Compound 11 | 40.0 | 3.0 | F444 | 5.0 | 31.0 |
| Liquid composition 60 | Glutaric acid | 21.0 | Compound 21 | 40.0 | 3.0 | F444 | 5.0 | 31.0 |
| Liquid composition 61 | Glutaric acid | 21.0 | Compound 22 | 40.0 | 3.0 | F444 | 5.0 | 31.0 |
| Liquid composition 62 | Glutaric acid | 21.0 | Compound 23 | 40.0 | 3.0 | F444 | 5.0 | 31.0 |
| Liquid composition 63 | Glutaric acid | 21.0 | Compound 24 | 40.0 | 3.0 | F444 | 5.0 | 31.0 |

Preparation of Clear Ink

Preparation of Clear Ink 1

The resin particle dispersion 1 obtained in the above was mixed with the components shown below.

| | |
|---|---|
| Resin particle dispersion 1 | 20.0% by mass |
| Glycerol | 7.0% by mass |
| Polyethylene glycol (number average molecular weight: 1,000) | 3.0% by mass |
| Compound 4 | 1.0% by mass |
| Acetylenol E100 (manufactured by Kawaken Fine Chemicals Co.) | 0.5% by mass |
| Ion-exchanged water | 68.5% by mass |

The mixture was thoroughly stirred and subjected to dispersion treatment and then subjected to pressure filtration through a microfilter with a pore size of 3.0 (manufactured by Fujifilm Co.), giving a clear ink 1.

Preparation of Clear Ink 2

The resin particle dispersion 1 obtained in the above was mixed with the components shown below.

| | |
|---|---|
| Resin particle dispersion 1 | 20.0% by mass |
| Water-soluble resin (a styrene-butyl acrylate-acrylic acid copolymer (acid value: 132 mg KOH/g, weight average molecular weight: 7,700, glass transition point: 78° C., solid content: 15% by mass)) | 8.0% by mass |
| Glycerol | 7.0% by mass |
| Polyethylene glycol (number average molecular weight: 1,000) | 3.0% by mass |
| Compound 9 | 1.5% by mass |
| Acetylenol E100 (manufactured by Kawaken Fine Chemicals Co.) | 0.5% by mass |
| Ion-exchanged water | 60.5% by mass |

The mixture was thoroughly stirred and subjected to dispersion treatment and then subjected to pressure filtration through a microfilter with a pore size of 3.0 μm (manufactured by Fujifilm Co.), giving a clear ink 2.

Evaluation

Images were recorded by the procedure described later, and the occurrence of image shift and the variation in dot diameter were observed to evaluate the image quality of the images. In the present invention, an image having at least one rank C in the following evaluation had low image quality and was regarded as an unacceptable level. With the image recorder used in the examples, the condition in which 3.0 nanograms (ng) of an ink drop is applied to a unit area of $1/1,200$ inch×$1/1,200$ inch at a resolution of 1,200 dpi×1,200 dpi is defined as a recording duty of 100%.

[1] Examples 1 to 80, Comparative Examples 1 to 24 (Direct Drawing Type Image Recording Method)

The liquid compositions and the inks obtained in the above were filled in ink cartridges, and the cartridges were combined as shown in Tables 4 and 5 and installed in a direct drawing type image recorder.

Variation in Dot Diameter

By using the image recorder, the liquid composition obtained in the above was first applied to a recording medium: Pearl Coat (manufactured by Mitsubishi Paper Mills Co.) at a coating amount of 1.0 g/m$^2$ with a coating roller. To the recording medium coated with the liquid composition, the cyan ink was then ejected from an ink jet recording head to record an image (solid image of 5 cm×5 cm) with a recording duty of 100%. To the area having the solid image recorded with the cyan ink and to the area without the solid image, the black ink was further applied. Then, the dot diameter $d_1$ of the black ink in the area having the solid image recorded with the cyan ink and the dot diameter $d_2$ of the black ink in the area without the solid image were determined, and the dot diameter ratio (=100× $|d_1-d_2|/d_1$) was calculated and evaluated on the basis of the criteria shown below. The evaluation results are shown in Tables 4 and 5.

AA: The dot diameter ratio was less than 5.
A: The dot diameter ratio was not less than 5 and less than 10.
B: The dot diameter ratio was not less than 10 and less than 20.
C: The dot diameter ratio was not less than 20 and less than 40.
D: The dot diameter ratio was not less than 40.

Occurrence of Image Shift

By using the image recorder, the liquid composition obtained in the above was first applied to a recording medium: Pearl Coat (manufactured by Mitsubishi Paper Mills Co.) at a coating amount of 1.0 g/m$^2$ with a coating roller. To the recording medium coated with the liquid composition, the black ink, the cyan ink, and the magenta ink were ejected from an ink jet recording head to record an image (solid image of 5 cm×5 cm) with a recording duty of 300% (recording duty of each ink: 100%). The obtained image was observed under a microscope to determine the occurrence of color skip. If image shift occurs, color skip occurs in a solid image. The evaluation criteria are as shown below. The evaluation results are shown in Tables 4 and 5.

A: No color skip occurred.
B: Color skip occurred partly but was able to be ignored.
C: Color skip occurred markedly.

[2] Examples 81 to 102, Comparative Examples 25 to 31 (Intermediate Transfer Type Image Recording Method)

First, an intermediate transfer member was prepared by the following procedure. The intermediate transfer member had a two-layer structure composed of a support member and a surface layer member. As the support member of the intermediate transfer member, a flat plate made of aluminum alloy was used for this structure in consideration of required characteristics such as the rigidity capable of withstanding the pressure during transfer and dimensional accuracy. As the surface layer member of the intermediate transfer member, a siloxane compound surface layer was formed from a hydrolyzable organic silicon compound as the raw material by the following procedure. Glycidoxypropyltriethoxysilane and methyltriethoxysilane were mixed at a molar ratio of 1:1. To the mixture, hydrochloric acid was added as a catalyst, and the resulting mixture in an aqueous solvent was heated and refluxed for 24 hours or more, giving a hydrolyzable condensate solution. The hydrolyzable condensate solution was diluted with methyl isobutyl ketone to 10 to 20% by mass, and a photocationic polymerization initiator, SP150 (manufactured by ADEKA Co.) was added at 5% by mass relative to the solid content, giving an intended coating solution. Next, the coating solution with the above formulation was used to form a film on the support member by spin coating. As a pretreatment of the support member, the surface was subjected to plasma treatment to improve the coating properties and the adhesion to the surface layer. Next, a UV lamp was used to irradiate the film, and the film was heated at 130° C. for 3 hours, giving a cured product. At this time, the surface layer of the cured product had a film thickness of about 0.3 μm.

The liquid compositions and the inks obtained in the above were filled in ink cartridges, and the cartridges were combined as shown in Tables 4 and 5 and installed in an intermediate transfer type image recorder (FIGURE) equipped with the intermediate transfer member obtained in the above.

Variation in Dot Diameter

By using the image recorder, the liquid composition obtained in the above was first applied to the intermediate transfer member at a coating amount of 1.0 g/m$^2$ with a coating roller. To the recording medium coated with the liquid composition, the cyan ink was then ejected from an ink jet recording head to record an image (solid image of 5 cm×5 cm) with a recording duty of 100%. To the area having the solid image recorded with the cyan ink and to the area without the solid image, the black ink was further applied. Then, the dot diameter $d_1$ of the black ink in the area having the solid image recorded with the cyan ink and the dot diameter $d_2$ of the black ink in the area without the solid image were determined, and the dot diameter ratio (=100×

$|d_1-d_2|/d_1)$ was calculated and evaluated on the basis of the criteria shown below. The evaluation results are shown in Tables 4 and 5.

AA: The dot diameter ratio was less than 5.

A: The dot diameter ratio was not less than 5 and less than 10.

B: The dot diameter ratio was not less than 10 and less than 20.

C: The dot diameter ratio was not less than 20 and less than 40.

D: The dot diameter ratio was not less than 40.

Occurrence of Image Shift

By using the image recorder, the liquid composition obtained in the above was first applied to the intermediate transfer member at a coating amount of 1.0 g/m² with a coating roller. To the recording medium coated with the liquid composition, the black ink, the cyan ink, and the magenta ink were ejected from an ink jet recording head to record an image (solid image of 5 cm×5 cm) with a recording duty of 300% (recording duty of each ink: 100%). The obtained image was observed under a microscope to determine the occurrence of color skip. If image shift occurs, color skip occurs in a solid image. The evaluation criteria are as shown below. The evaluation results are shown in Tables 4 and 5.

A: No color skip occurred.

B: Color skip occurred partly but was able to be ignored.

C: Color skip occurred markedly.

TABLE 4

| | | Liquid | Evaluation result | |
|---|---|---|---|---|
| Example No. | Ink No. | composition No. | Dot diameter | Image shift |
| Example 1 | Ink 1 | Liquid composition 1 | B | B |
| Example 2 | Ink 2 | Liquid composition 1 | A | B |
| Example 3 | Ink 3 | Liquid composition 1 | A | A |
| Example 4 | Ink 4 | Liquid composition 1 | AA | A |
| Example 5 | Ink 5 | Liquid composition 1 | AA | A |
| Example 6 | Ink 6 | Liquid composition 1 | A | A |
| Example 7 | Ink 7 | Liquid composition 1 | A | A |
| Example 8 | Ink 8 | Liquid composition 1 | A | A |
| Example 9 | Ink 9 | Liquid composition 1 | AA | A |
| Example 10 | Ink 10 | Liquid composition 1 | AA | A |
| Example 11 | Ink 11 | Liquid composition 1 | A | A |
| Example 12 | Ink 12 | Liquid composition 1 | A | A |
| Example 13 | Ink 13 | Liquid composition 1 | A | A |
| Example 14 | Ink 14 | Liquid composition 1 | A | A |
| Example 15 | Ink 15 | Liquid composition 1 | A | A |
| Example 16 | Ink 16 | Liquid composition 1 | B | B |
| Example 17 | Ink 17 | Liquid composition 1 | B | A |
| Example 18 | Ink 18 | Liquid composition 1 | B | A |
| Example 19 | Ink 19 | Liquid composition 1 | A | A |
| Example 20 | Ink 20 | Liquid composition 1 | AA | A |

TABLE 4-continued

| | | Liquid | Evaluation result | |
|---|---|---|---|---|
| Example No. | Ink No. | composition No. | Dot diameter | Image shift |
| Example 21 | Ink 21 | Liquid composition 1 | AA | A |
| Example 22 | Ink 22 | Liquid composition 1 | A | A |
| Example 23 | Ink 23 | Liquid composition 1 | A | A |
| Example 24 | Ink 24 | Liquid composition 1 | AA | A |
| Example 25 | Ink 25 | Liquid composition 1 | AA | A |
| Example 26 | Ink 26 | Liquid composition 1 | AA | A |
| Example 27 | Ink 27 | Liquid composition 1 | B | A |
| Example 28 | Ink 28 | Liquid composition 1 | B | B |
| Example 29 | Ink 29 | Liquid composition 1 | A | B |
| Example 30 | Ink 30 | Liquid composition 1 | AA | A |
| Example 31 | Ink 31 | Liquid composition 1 | AA | A |
| Example 32 | Ink 32 | Liquid composition 1 | A | B |
| Example 33 | Ink 33 | Liquid composition 1 | B | B |
| Example 34 | Ink 34 | Liquid composition 1 | A | A |
| Example 35 | Ink 35 | Liquid composition 1 | AA | A |
| Example 36 | Ink 36 | Liquid composition 1 | AA | A |
| Example 37 | Ink 4 | Liquid composition 2 | AA | A |
| Example 38 | Ink 4 | Liquid composition 3 | AA | A |
| Example 39 | Ink 4 | Liquid composition 4 | AA | A |
| Example 40 | Ink 4 | Liquid composition 5 | AA | A |
| Example 41 | Ink 37 | Liquid composition 6 | B | B |
| Example 42 | Ink 37 | Liquid composition 7 | B | B |
| Example 43 | Ink 37 | Liquid composition 8 | B | A |
| Example 44 | Ink 37 | Liquid composition 9 | A | A |
| Example 45 | Ink 37 | Liquid composition 10 | A | A |
| Example 46 | Ink 37 | Liquid composition 11 | A | A |
| Example 47 | Ink 37 | Liquid composition 12 | B | A |
| Example 48 | Ink 37 | Liquid composition 13 | A | A |
| Example 49 | Ink 37 | Liquid composition 14 | A | A |
| Example 50 | Ink 37 | Liquid composition 15 | A | A |
| Example 51 | Ink 37 | Liquid composition 16 | B | A |
| Example 52 | Ink 37 | Liquid composition 17 | A | A |
| Example 53 | Ink 37 | Liquid composition 18 | A | A |
| Example 54 | Ink 37 | Liquid composition 19 | A | A |
| Example 55 | Ink 37 | Liquid composition 20 | B | A |
| Example 56 | Ink 37 | Liquid composition 21 | B | B |
| Example 57 | Ink 37 | Liquid composition 22 | B | A |
| Example 58 | Ink 37 | Liquid composition 23 | B | A |

TABLE 4-continued

| Example No. | Ink No. | Liquid composition No. | Evaluation result Dot diameter | Evaluation result Image shift |
|---|---|---|---|---|
| Example 59 | Ink 37 | Liquid composition 24 | A | A |
| Example 60 | Ink 37 | Liquid composition 25 | A | A |
| Example 61 | Ink 37 | Liquid composition 26 | A | A |
| Example 62 | Ink 37 | Liquid composition 27 | A | A |
| Example 63 | Ink 37 | Liquid composition 28 | B | A |
| Example 64 | Ink 37 | Liquid composition 29 | A | A |
| Example 65 | Ink 37 | Liquid composition 30 | A | A |
| Example 66 | Ink 37 | Liquid composition 31 | A | A |
| Example 67 | Ink 37 | Liquid composition 32 | B | B |
| Example 68 | Ink 37 | Liquid composition 33 | B | B |
| Example 69 | Ink 37 | Liquid composition 34 | A | B |
| Example 70 | Ink 37 | Liquid composition 35 | A | A |
| Example 71 | Ink 37 | Liquid composition 36 | AA | A |
| Example 72 | Ink 37 | Liquid composition 37 | AA | A |
| Example 73 | Ink 37 | Liquid composition 38 | A | A |
| Example 74 | Ink 37 | Liquid composition 39 | B | A |
| Example 75 | Ink 38 | Liquid composition 34 | A | B |
| Example 76 | Ink 39 | Liquid composition 8 | AA | A |
| Example 77 | Ink 40 | Liquid composition 8 | AA | A |
| Example 78 | Ink 41 | Liquid composition 1 | AA | A |
| Example 79 | Ink 4 | Liquid composition 35 | AA | A |
| Example 80 | Ink 43 | Liquid composition 1 | B | B |
| Example 81 | Ink 1 | Liquid composition 40 | B | B |
| Example 82 | Ink 2 | Liquid composition 40 | A | B |
| Example 83 | Ink 3 | Liquid composition 40 | A | A |
| Example 84 | Ink 4 | Liquid composition 40 | AA | A |
| Example 85 | Ink 8 | Liquid composition 40 | A | A |
| Example 86 | Ink 9 | Liquid composition 40 | AA | A |
| Example 87 | Ink 10 | Liquid composition 40 | AA | A |
| Example 88 | Ink 11 | Liquid composition 40 | A | A |
| Example 89 | Ink 19 | Liquid composition 40 | A | A |
| Example 90 | Ink 20 | Liquid composition 40 | AA | A |
| Example 91 | Ink 37 | Liquid composition 52 | B | B |
| Example 92 | Ink 37 | Liquid composition 53 | B | B |
| Example 93 | Ink 37 | Liquid composition 54 | B | A |
| Example 94 | Ink 37 | Liquid composition 55 | A | A |
| Example 95 | Ink 37 | Liquid composition 56 | A | A |
| Example 96 | Ink 37 | Liquid composition 57 | A | A |
| Example 97 | Ink 37 | Liquid composition 58 | A | A |
| Example 98 | Ink 37 | Liquid composition 59 | B | A |
| Example 99 | Ink 37 | Liquid composition 60 | A | A |
| Example 100 | Ink 37 | Liquid composition 61 | A | A |
| Example 101 | Ink 37 | Liquid composition 62 | B | A |
| Example 102 | Ink 37 | Liquid composition 63 | A | A |

TABLE 5

| Comparative Example No. | Ink No. | Liquid composition No. | Evaluation result Dot diameter | Evaluation result Image shift |
|---|---|---|---|---|
| Comparative Example 1 | Ink 42 | Liquid composition 1 | D | C |
| Comparative Example 2 | Ink 44 | Liquid composition 1 | D | C |
| Comparative Example 3 | Ink 45 | Liquid composition 8 | C | B |
| Comparative Example 4 | Ink 46 | Liquid composition 1 | C | C |
| Comparative Example 5 | Ink 47 | Liquid composition 1 | C | C |
| Comparative Example 6 | Ink 48 | Liquid composition 1 | C | B |
| Comparative Example 7 | Ink 49 | Liquid composition 1 | D | C |
| Comparative Example 8 | Ink 50 | Liquid composition 1 | D | C |
| Comparative Example 9 | Ink 51 | Liquid composition 1 | C | C |
| Comparative Example 10 | Ink 52 | Liquid composition 1 | C | C |
| Comparative Example 11 | Ink 53 | Liquid composition 1 | B | C |
| Comparative Example 12 | Ink 54 | Liquid composition 1 | C | C |
| Comparative Example 13 | Ink 55 | Liquid composition 1 | B | C |
| Comparative Example 14 | Ink 37 | Liquid composition 42 | D | C |
| Comparative Example 15 | Ink 37 | Liquid composition 43 | D | C |
| Comparative Example 16 | Ink 37 | Liquid composition 44 | D | C |
| Comparative Example 17 | Ink 37 | Liquid composition 45 | D | B |
| Comparative Example 18 | Ink 37 | Liquid composition 46 | D | C |
| Comparative Example 19 | Ink 37 | Liquid composition 47 | D | C |
| Comparative Example 20 | Ink 37 | Liquid composition 48 | D | C |
| Comparative Example 21 | Ink 37 | Liquid composition 49 | D | C |
| Comparative Example 22 | Ink 37 | Liquid composition 50 | C | C |
| Comparative Example 23 | Ink 37 | Liquid composition 51 | D | C |
| Comparative Example 24 | Ink 37 | Liquid composition 52 | C | B |
| Comparative Example 25 | Ink 44 | Liquid composition 40 | D | C |
| Comparative Example 26 | Ink 46 | Liquid composition 40 | C | C |
| Comparative Example 27 | Ink 51 | Liquid composition 40 | C | C |

TABLE 5-continued

| Comparative Example No. | Ink No. | Liquid composition No. | Evaluation result | |
|---|---|---|---|---|
| | | | Dot diameter | Image shift |
| Comparative Example 28 | Ink 52 | Liquid composition 40 | C | C |
| Comparative Example 29 | Ink 53 | Liquid composition 40 | B | C |
| Comparative Example 30 | Ink 54 | Liquid composition 40 | C | C |
| Comparative Example 31 | Ink 55 | Liquid composition 40 | B | C |

[3] Example 103 (Direct Drawing Type Image Recording Method)

The liquid composition 1, the ink 4, and the clear ink 1 obtained in the above were filled in ink cartridges, and the cartridges were installed in a direct drawing type image recorder. The following evaluations were carried out, giving rank A in each evaluation.

Smeared Image

On a recording medium coated at a coating amount of 1.0 g/m² with the liquid composition 1 by using the above image recorder, a solid image with a duty of 300% (recording duty of each ink: 100%) was formed in an area of 5 cm×5 cm by using the cyan ink 4, the magenta ink 4, and the clear ink 1. If the clear ink has insufficient agglutinating properties, a solid image is smeared (smeared image occurs). The presence or absence of the occurrence of the smeared image was determined by observing the occurrence of color unevenness/gloss unevenness in the final image. The evaluation criteria are as shown below.

A: A smeared image was suppressed.
B: A smeared image occurred slightly but was able to be ignored.
C: A smeared image occurred markedly.

Occurrence of Image Shift

By using the image recorder, the liquid composition 1 obtained in the above was first applied to a recording medium: Pearl Coat (manufactured by Mitsubishi Paper Mills Co.) at a coating amount of 1.0 g/m² with a coating roller. To the recording medium coated with the liquid composition 1, the black ink 4, the cyan ink 4, the magenta ink 4, and the clear ink 1 were ejected from an ink jet recording head to record an image (solid image of 5 cm×5 cm) with a recording duty of 300% (recording duty of each ink: 100%). The obtained image was observed under a microscope to determine the occurrence of color skip. If image shift occurs, color skip occurs in a solid image. The evaluation criteria are as shown below.

A: No color skip occurred.
B: Color skip occurred partly but was able to be ignored.
C: Color skip occurred markedly.

[4] Example 104 (Intermediate Transfer Type Image Recording Method)

The liquid composition 40, the ink 9, and the clear ink 2 obtained in the above were filled in ink cartridges, and the cartridges were installed in an intermediate transfer type image recorder. The following evaluations were carried out, giving rank A in each evaluation.

Smeared Image

On an intermediate transfer member coated at a coating amount of 1.0 g/m² with the liquid composition 40 by using the above image recorder, a solid image with a duty of 300% (recording duty of each ink: 100%) was formed in an area of 5 cm×5 cm by using the cyan ink 9, the magenta ink 9, and the clear ink 2. If the clear ink has insufficient agglutinating properties, a solid image is smeared (smeared image occurs). The presence or absence of the occurrence of the smeared image was determined by observing the occurrence of color unevenness/gloss unevenness in the final image. The evaluation criteria are as shown below.

A: A smeared image was suppressed.
B: A smeared image occurred slightly but was able to be ignored.
C: A smeared image occurred markedly.

Occurrence of Image Shift

By using the image recorder, the liquid composition 40 obtained in the above was first applied to an intermediate transfer member at a coating amount of 1.0 g/m² with a coating roller. To the intermediate member coated with the liquid composition 40, the black ink 9, the cyan ink 9, the magenta ink 9, and the clear ink 2 were ejected from an ink jet recording head to record an image (solid image of 5 cm×5 cm) with a recording duty of 300% (recording duty of each ink: 100%). The obtained image was observed under a microscope to determine the occurrence of color skip. If image shift occurs, color skip occurs in a solid image. The evaluation criteria are as shown below.

A: No color skip occurred.
B: Color skip occurred partly but was able to be ignored.
C: Color skip occurred markedly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a divisional of U.S. patent application Ser. No. 14/983,909, filed Dec. 30, 2015, which claims the benefit of Japanese Patent Application No. 2015-002611, filed Jan. 8, 2015, which are hereby incorporated by reference herein in their entirety.

What is claimed is:

1. An ink comprising:
    (a) a coloring material;
    (b) anionic resin particles; and
    (c) a pentahydric or higher and a dodecahydric or lower polyhydric alcohol compound having a group formed by substituting a hydrogen atom of a hydroxyl group by a structure represented by —$R_n$—H, where R is an alkyleneoxy group including an ethyleneoxy group, and the number of "R"s per molecule is 40 or more and 400 or less.

2. The ink according to claim 1, wherein the R is the alkyleneoxy group including the ethyleneoxy group and a propyreneoxy group.

3. The ink according to claim 1, wherein, in the structure represented by —$R_n$—H, the n is 2.0 to 66.7.

4. The ink according to claim 1, wherein a content of the anionic resin particles is 1.0% by mass or more based on the total mass of the ink.

5. The ink according to claim 1, wherein a content of the pentahydric or higher and the dodecahydric or lower polyhydric alcohol compound is 0.6% by mass or more based on the total mass of the ink.

6. The ink according to claim 5, wherein the content of the pentahydric or higher and the dodecahydric or lower polyhydric alcohol compound is 0.6% by mass or more and 10.0% by mass or less based on the total mass of the ink.

7. The ink according to claim 1, wherein a mass ratio of the content of the anionic resin particles relative to the content of the pentahydric or higher and the dodecahydric or lower polyhydric alcohol compound based on the total mass of the ink is 0.5 or more and 25.0 or less.

8. The ink according to claim 1, wherein the anionic resin particles comprise a polymer of a monomer composition comprising at least one monomer selected from the group consisting of ester compounds of α,β-unsaturated carboxylic acids and α,β-ethylenically unsaturated compounds having an aryl group.

9. The ink according to claim 1, wherein the coloring material is a pigment.

10. The ink according to claim 1, further comprising water, wherein a content of the water is 50.0% by mass or more and 95.0% by mass or less based on the total mass of the ink.

11. The ink according to claim 1, wherein the pentahydric or higher and the dodecahydric or lower polyhydric alcohol compound is represented by the following general formula A, B, or C:

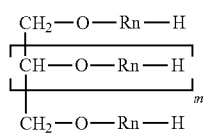

general formula A wherein, in general formula A, m is 3 to 4;

general formula B:

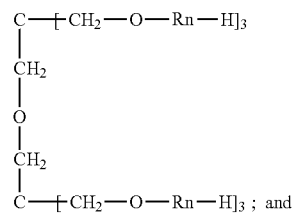

general formula B

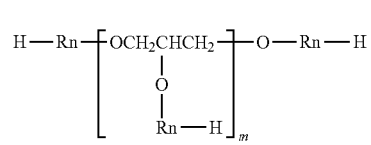

general formula C wherein, in general formula C, m is 3 to 10.

12. The ink according to claim 11, wherein, in general formula C, m is 4 to 10.

* * * * *